United States Patent
Mirabella et al.

(10) Patent No.: US 10,255,406 B2
(45) Date of Patent: Apr. 9, 2019

(54) DESIGNING THE GEOMETRY OF A GAS TURBINE EXHAUST DIFFUSER ON THE BASIS OF FLUID DYNAMICS INFORMATION

(71) Applicant: Siemens Corporation, Iselin, NJ (US)

(72) Inventors: Lucia Mirabella, Plainsboro, NJ (US); Suraj Musuvathy, Glenmont, NY (US); Bharat Sanjay Prabhu, Port Orange, FL (US)

(73) Assignee: SIEMENS CORPORATION, Iselin, NJ (US)

( * ) Notice: Subject to any disclaimer, the term of this patent is extended or adjusted under 35 U.S.C. 154(b) by 421 days.

(21) Appl. No.: 15/047,766

(22) Filed: Feb. 19, 2016

(65) Prior Publication Data

US 2016/0246916 A1    Aug. 25, 2016

Related U.S. Application Data

(60) Provisional application No. 62/119,910, filed on Feb. 24, 2015.

(51) Int. Cl.
*G06F 17/50* (2006.01)
*F01D 25/30* (2006.01)
(Continued)

(52) U.S. Cl.
CPC ...... *G06F 17/5086* (2013.01); *G06F 17/5018* (2013.01); *G06F 17/5068* (2013.01);
(Continued)

(58) Field of Classification Search
None
See application file for complete search history.

(56) References Cited

U.S. PATENT DOCUMENTS 5,338,155 A * 8/1994 Kreitmeier .............. F01D 25/30
                                                        415/211.2
6,160,759 A * 12/2000 Nestler .................. A01K 61/00
                                                          367/139

(Continued)

OTHER PUBLICATIONS

PCT International Search Report dated May 2, 2016; PCT/US2016/019309; Filing Date: Feb. 24, 2016; 12 pages.
(Continued)

*Primary Examiner* — Kibrom K Gebresilassie (57) ABSTRACT

A computer-implemented method for designing a gas turbine exhaust diffuser includes a computer identifying an initial diffuser design and performing a design refinement process. The design refinement process includes generating a new diffuser design by modifying the initial diffuser design according to one or more objective functions and one or more design constraints. A fluid velocity pattern associated with the new diffuser design is determined and used to compute particle tracing lines through an internal portion of the new diffuser design. The particle tracing lines are grouped into particle line bundles extending longitudinally within the new diffuser design and an average path is computed for each particle line bundle. Then, for each respective average path, a rigid tube capable of channeling gases through the internal portion of the new diffuser design is generated and added to the new diffuser design.

20 Claims, 4 Drawing Sheets

(51) Int. Cl.
*F04D 29/54* (2006.01)
*F01D 5/14* (2006.01)

(52) U.S. Cl.
CPC .............. *F01D 5/146* (2013.01); *F01D 25/30* (2013.01); *F04D 29/542* (2013.01); *F05D 2220/32* (2013.01); *G06F 2217/16* (2013.01); *Y02T 50/673* (2013.01); *Y10T 477/40* (2015.01)

(56) References Cited

U.S. PATENT DOCUMENTS

| | | | | |
|---|---|---|---|---|
| 6,866,479 | B2* | 3/2005 | Ishizaka | F01D 25/30 415/209.1 |
| 9,359,900 | B2* | 6/2016 | Chengappa | F01D 5/145 |
| 9,441,502 | B2* | 9/2016 | Gbadebo | F01D 5/141 |
| 9,598,981 | B2* | 3/2017 | Salunkhe | F01D 25/30 |
| 9,909,491 | B2* | 3/2018 | Bromberg | F02B 65/00 |
| 2002/0147573 | A1* | 10/2002 | Miyori | G06F 17/5018 703/9 |
| 2003/0002975 | A1* | 1/2003 | Dudebout | F01D 5/142 415/1 |
| 2003/0040894 | A1* | 2/2003 | Miyori | G06F 17/5018 703/6 |
| 2003/0147075 | A1* | 8/2003 | Otsuki | C23C 16/4405 356/338 |
| 2004/0093147 | A1* | 5/2004 | Kumar | F01D 17/02 701/100 |
| 2005/0172607 | A1* | 8/2005 | Ishizaka | F01D 5/142 60/39.5 |
| 2009/0183630 | A1* | 7/2009 | Vroman | H01L 21/67017 95/45 |
| 2011/0151141 | A1* | 6/2011 | Upadhyaya | C23C 16/045 427/578 |
| 2012/0049054 | A1* | 3/2012 | Zhou | B82Y 15/00 250/265 |
| 2013/0174534 | A1* | 7/2013 | Pushkaran | F01D 25/30 60/226.3 |
| 2013/0189088 | A1* | 7/2013 | Nanda | F01D 9/065 415/177 |
| 2014/0178187 | A1* | 6/2014 | Sakekar | F02C 7/00 415/185 |
| 2016/0009364 | A1* | 1/2016 | Goel | B64C 3/141 244/206 |
| 2016/0069570 | A1* | 3/2016 | Twardochleb | F23R 3/10 60/796 |

OTHER PUBLICATIONS

Emil Gottlich: II Research on the 1-20 aerodynamics of intermediate turbine diffusers, Progress in Aerospace Sciences, vol. 47, No. 4, Apr. 14, 2011 (Apr. 14, 2011), pp. 249-479, XP028380175 / Apr. 14, 2011.

* cited by examiner

DESIGNING THE GEOMETRY OF A GAS TURBINE EXHAUST DIFFUSER ON THE BASIS OF FLUID DYNAMICS INFORMATION

CROSS-REFERENCE TO RELATED APPLICATIONS

This application claims the benefit of U.S. Provisional Application Ser. No. 62/119,910 filed Feb. 24, 2015, which is incorporated herein by reference in its entirety.

TECHNICAL FIELD

The present invention relates generally to methods, systems, and apparatuses for designing the geometry of a gas turbine exhaust diffuser on the basis of fluid dynamics information. The disclosed methods, systems, and apparatuses may be applied, for example to develop new diffuser designs with the goal of improving the energy efficiency of the turbine combined cycle.

BACKGROUND

Figure 1:
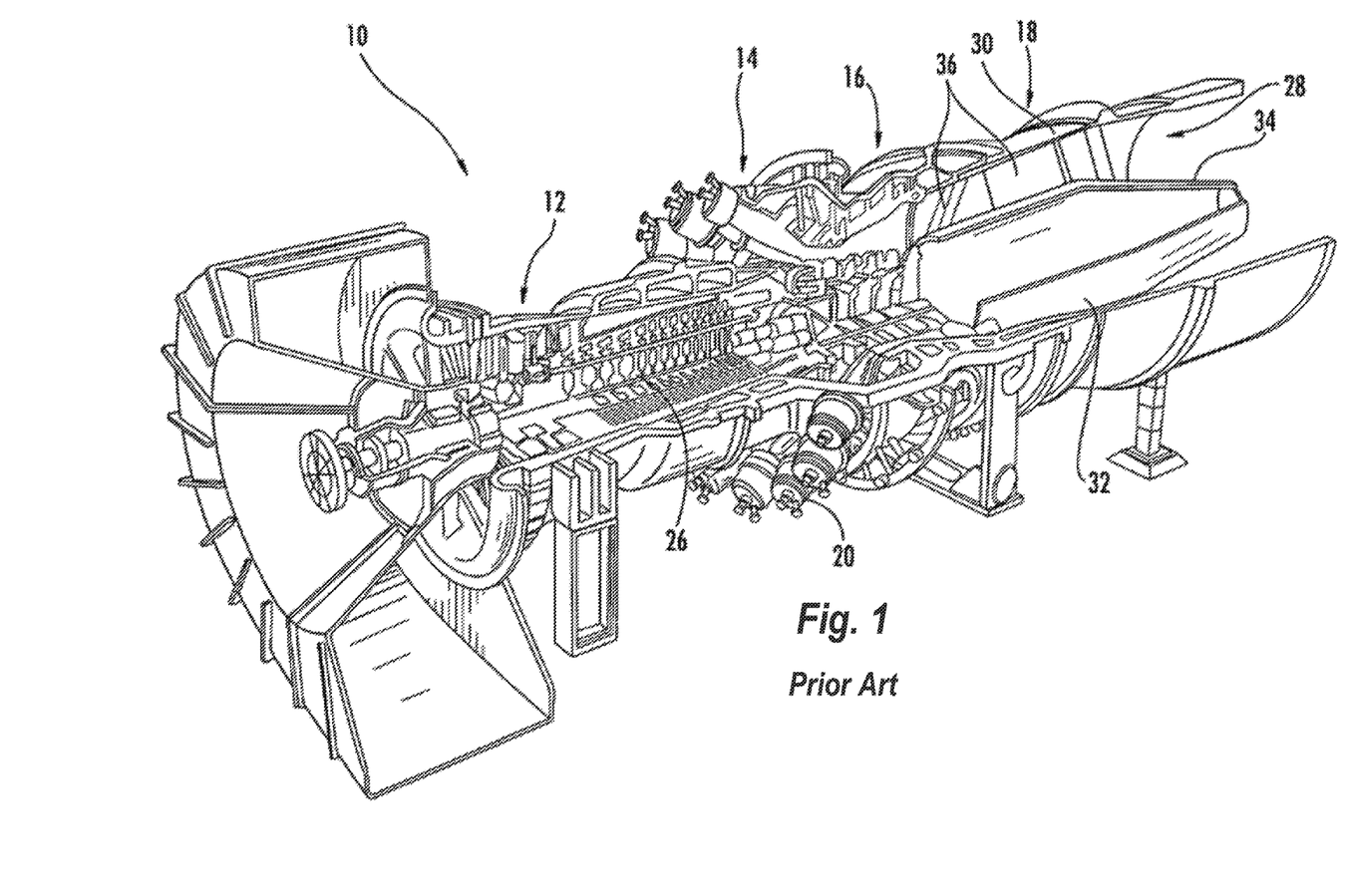
FIG. 1 provides an cutaway view of an example turbine engine.

FIG. 1 provides a cutaway view of an example turbine engine comprising a compressor section 12, a combustor section 14, a turbine section 16 and an exhaust section 18. In operation, the compressor section 12 can induct ambient air and can compress it. The compressed air from the compressor section 12 can enter one or more combustors 20 in the combustor section 14. The compressed air can be mixed with the fuel, and the air-fuel mixture can be burned in the combustors 20 to form a hot working gas. The hot gas can be routed to the turbine section 16 where it is expanded through alternating rows of stationary airfoils and rotating airfoils and used to generate power that can drive a rotor 26. The expanded gas exiting the turbine section 16 can be exhausted from the engine 10 via the exhaust section 18.

The exhaust section 18 can be configured as a diffuser 28, which can be a divergent duct formed between an outer shell 30 and a center body or hub 32 and a tail cone 34. The primary function of the exhaust diffuser 28 is to convert kinetic energy into potential energy, increasing the pressure of the fluid and decreasing its velocity. The diffuser is typically designed as a divergent duct shape with support struts 36, and design requirements have been formulated in the past years to tune its shape optimizing the aerodynamic performances. However the current design still has limitations, in terms of energy losses, which are not overcome by implementing small design variations. In addition, the size of the current design of the diffuser is typically large (axial length of about 20 meters), making its manufacturing, transportation, installation and maintenance very complex and expensive.

Design variations on the basic divergent duct shape have been introduced in the past, for example, by studying the angle of the divergent surface attachment, using splitter vanes or vortex generators, or wall riblets and aerodynamically shaped support structures designed to reduce air drag. However these design implementations were proposed as ad-hoc unique modifications, dictated by the prior engineering experience. Accordingly, it is desired to generate an aerodynamic-based design tool which automatically generates novel design paradigms for the turbine exhaust diffuser.

SUMMARY

Embodiments of the present invention address and overcome one or more of the above shortcomings and drawbacks, by providing methods, systems, and apparatuses related to designing the geometry of a gas turbine exhaust diffuser on the basis of fluid dynamics information. The design and exit conditions of the turbine blade section determine the flow structures exiting the turbine and entering the diffuser. This flow velocity is characterized by an axial component and a circumferential swirl component. Air velocity exiting the turbine has higher circumferential components away from the hub and near the inner surfaces of the diffuser casing. With a conical shape of the inner surfaces, the full potential of circumferential components are not realized and incur losses. The techniques described herein are based on the rationale that a more energy efficient fluid-dynamics in the exhaust could be achieved by sustaining the natural motion of the fluid. By developing optimal aerodynamic shapes on the inner side of the diffuser casing, the pressure gains from the circumferential components air flow can be harvested.

According to some embodiments, a computer-implemented method for designing a gas turbine exhaust diffuser includes a computer identifying an initial diffuser design and performing a design refinement process. The design refinement process includes generating a new diffuser design by modifying the initial diffuser design according to one or more objective functions and one or more design constraints. A fluid velocity pattern associated with the new diffuser design is determined and used to compute particle tracing lines through an internal portion of the new diffuser design. The particle tracing lines are grouped into particle line bundles extending longitudinally within the new diffuser design and an average path is computed for each particle line bundle. Then, for each respective average path, a rigid tube capable of channeling gases through the internal portion of the new diffuser design is generated and added to the new diffuser design. In some embodiments, the design refinement process is iteratively repeated one or more additional times to generate at least one additional new diffuser design, wherein each additional new design is generated using a unique set of design constraints.

Various techniques may be employed for generating the new diffuser design in the aforementioned method. For example, in some embodiments, the new diffuser design is generated by selecting one or more enclosed surfaces of the initial diffuser design and omitting the one or more enclosed surfaces from the new diffuser design (e.g., a strut component). In other embodiments, the new diffuser design is generated by utilizing new material properties which provide more longitudinal flexibility than the existing material properties associated with a lateral portion of the initial diffuser design. For example, in some embodiments, these new material properties correspond to a non-rigid elastic membrane. In some embodiments, generation of the new diffuser design is constrained such that the inlet and/or the outlet of the new design are not relocated from their position in the initial design. Similarly, a constraint may be used during generation of the new diffuser design such that the shape of the inlet and/or the outlet in the new design is the same as that used in the initial design.

According to other embodiments of the present invention, an article of manufacture for designing a gas turbine exhaust diffuser comprises a non-transitory, tangible computer-readable medium holding computer-executable instructions for performing the aforementioned method, with or without the additional features set out above.

According to other embodiments of the present invention, a computer-implemented method for designing a gas turbine exhaust diffuser includes a computer identifying an initial diffuser design and a parallel computing architecture performing a design refinement process. This process includes executing multiple instances of a computational fluid model generation module in parallel to generate a plurality of alternative diffuser designs and executing multiple instances of a Computational Fluid Dynamics (CFD) simulation module in parallel to generate a fluid velocity pattern for each of the plurality of alternative diffuser designs. Each respective alternative diffuser design is supplemented with one or more rigid tubes configured to facilitate gas flow according to the respective alternative diffuser design's corresponding fluid velocity pattern. In some embodiments, the method further includes executing multiple instances of a particle tracing module in parallel to generate trace particle flow through each of the alternative diffuser designs, according to its fluid respective velocity pattern. Then, for each respective alternative diffuser design, the particle flow for the respective alternative diffuser design is utilized to identify locations for its one or more rigid tubes.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses designing the geometry of a gas turbine exhaust diffuser on the basis of fluid dynamics information. Briefly, a methodology is disclosed herein which takes into account physical behavior of gas fluid dynamic inside the turbine exhaust diffuser to define new design paradigms for it. This methodology is based on the rationale that a more energy efficient fluid-dynamics in the exhaust could be achieved by indulging the natural motion of the fluid, hence reducing energy losses. Accordingly, the disclosed methods, systems, and apparatuses may be applied to develop new exhaust diffuser designs with the goal of improving the energy efficiency of the turbine combined cycle and to potentially reduce the cost of transportation and maintenance of the turbine, under the assumption that more compact shape factors could be achieved.

Figure 2:
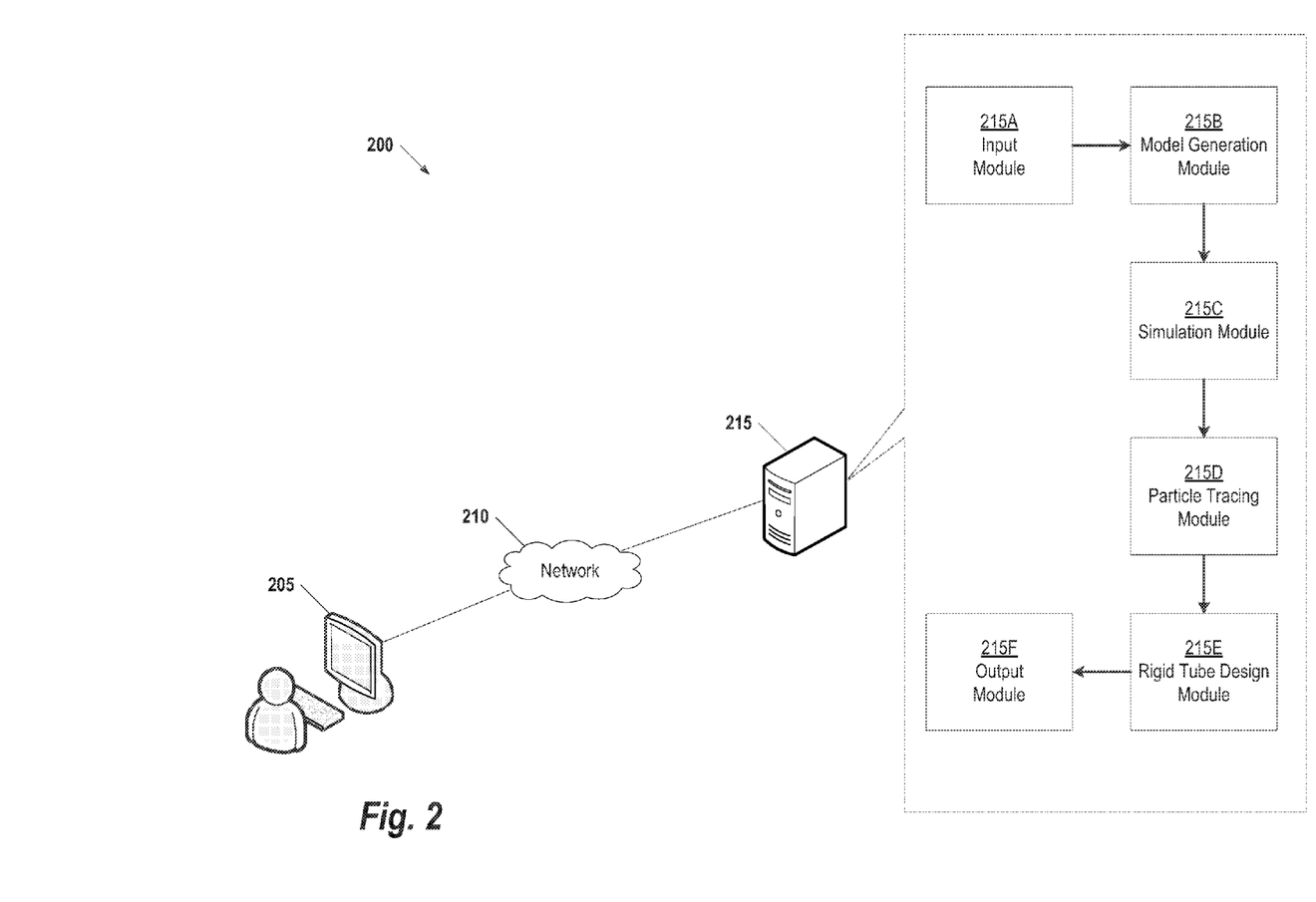
FIG. 2 provides an overview of a system that a user may apply in some embodiments to designing the geometry of a gas turbine exhaust diffuser on the basis of fluid dynamics information.

FIG. 2 provides an overview of a system 200 that a user may apply in some embodiments to designing the geometry of a gas turbine exhaust diffuser on the basis of fluid dynamics information. This system may be applied to develop new diffuser designs through the iterative creation of computer aided design (CAD) models and computer aided engineering (CAE) analysis of aerodynamics and structural analysis with comparison with an existing diffuser as baseline. The user may be, for example, a design engineer tasked with designing a diffuser for incorporation into an existing or new turbine design. Such a device may have millions, if not billions, of different design parameters. Thus, as an initial task, the user must determine which parameters have the most impact on system performance. In this way, the user can determine which parameters to focus resources on for additional analysis.

To analyze various diffuser designs, the User Computer 205 connects to a Design Computer 215 via a Network 210. The Network 210 can generally be any computer network generally known in the art. Thus, in some embodiments, the User Computer 205 connects over a wired or wireless local area network to the Design Computer 215. In other embodiments, the Design Computer 215 may be implemented in a location remote form the location of the User Computer 205. For example, the Design Computer 215 can be implemented using a "cloud computing" architecture model which allows the User Computer 205 to connect via the Internet.

Various interfaces may be used to facilitate the communications between the User Computer 205 and the Design Computer 215. For example, in some embodiments the Parameter Selection Computer supports a web application which displays a graphical user interface (GUI) in a webpage on the User Computer 205. The User can then interact with the Design Computer 215. In other embodiments, the Design Computer 215 may be configured to accept commands via a custom application programming interface (API). Thus, for example, a development tool installed on the User Computer 205 may be configured to use the API in parameter selection.

Design Computer 215 provides an automated way of analyzing the design parameter space to identify the parameters that are most relevant to the set of design requirements. The Input Module 215A is configured to receive a computer aided design (CAD) geometry dataset of one realization of diffuser being designed. The received geometry includes a combination of geometric and other design parameters (herein referred to as the "baseline design"). The baseline design may also include a probability distribution for each of the geometric parameters. The Input Module 215A may also be configured to receive one or more performance metric(s) defining the user's requirements for the design of the physical object. These requirements may be specified, for example, in a data file formatted in any general file format known in the art (e.g., Extensible Markup Language). Examples of performance metrics may be mechanical properties (e.g., deformation in particular areas of the object), electrical (e.g., energy efficiency), or even metrics not directly related to the physical object itself (e.g., cost to manufacture).

Using the baseline design as input, a Model Generation Component 215B generates a new diffuser design by optimizing the design according to one or more objective functions. These functions can be tailored to focus on any criteria of interest to the user and multiple objectives functions can be combined can be weighted accordingly. Examples of characteristics that may be optimized by the objective functions include, without limitation, efficiency, pressure loss transportability (weight, dimensions, etc.), and/or materials cost. In general, any suitable optimization algorithm known in the art may be used for solving the objective function. Additionally, in some instances, the weighting values applied to the objective functions may include a randomization component which allows the optimized design to change over multiple iterations of the model design process (described in further detail below with respect to FIG. 3).

A Simulation Module 215C is configured to apply Computational Fluid Dynamics (CFD) simulation using the new diffuser design as input. CFD uses numerical methods and algorithms to solve and analyze problems that involve fluid flows. The Simulation Module 215C employs a simulation-driven design methodology to analyze the physical behavior of gas fluid dynamics in the exhaust diffuser. The velocity pattern in the current design is analyzed using CFD in order to compute particle tracing lines, with generating seeds placed on the inlet section. Based on the trace lines, new optimized paths are computed and that can then be used as centerlines to design rigid tubes, channeling the gas flow, and the tubes will be combined in the diffuser design. The expectation is that this channeled flow will reduce the areas of flow stagnation and low pressure inside the diffuser, increasing the overall pressure recovery. In addition, such transformative designs will enable a reduction in the axial length of the diffuser. Additionally, in some embodiments, the Simulation Module 215C may use the results of CFD and Finite Element Analysis (FEA) to design appropriate supporting structures for the diffuser to withstand loads.

The velocity pattern generated by the Simulation Module 215C is used as input to a Particle Tracing Module 215D which is configured to compute particle tracing lines, with generating seeds placed on the inlet section. Techniques for particle tracing are generally known in the art and, thus, are not described in detail here. Generally, particle tracing can be performed in computational or physical space. Computational space tracing routines are generally less time consuming than physical space tracing procedures; however, computational space procedures are generally less accurate because they rely on Jacobian matrices transformations which only approximate the particle position. Thus, the particular particle tracing routine employed by the Particle Tracing Module 215D may be selected according to factors such as the available computational resources available at the Design Computer 215 and desired fidelity of the user's tolerance for errors in particle tracking.

Based on the trace lines generated by the Particle Tracing Module 215D, a Rigid Tube Design Module 215E computes new optimized paths which are then used as centerlines to design rigid tubes for incorporation in the diffuser design. These tubes channel the gas flow, while reducing the areas of flow stagnation and low pressure inside the diffuser, increasing the overall pressure recovery. In general, each rigid tube designed by the Rigid Tube Design Module 215E will be centered along a particular particle path, extending at a predetermined radius. This predetermined radius may be designated by the user as an input or, alternatively, the Rigid Tube Design Module 215E may select the radius analytically, for example, based on the number of tubes that will be included in the diffuser design and the desired flow rate.

The Output Module 215F provides new diffuser design, including the rigid tubes, in a GUI for display on the User Computer 205. At this point, the User may accept the new diffuser design and save it (e.g., locally on the User Computer 205 or on the Design Computer 215). Alternatively, the new diffuser design may be transmitted to one more external source for further incorporation into a larger gas turbine design.

The separation of the User Computer 205 and the Design Computer 215, as illustrated in FIG. 2, is one example of how the various systems and techniques described herein may be implemented. In other embodiments, for example, the functionality of the Design Computer 215 may be implemented directly in an application installed on the User Computer 205, thus eliminating the need for separate physical device. Additionally, in some embodiments, various components of the system 200 are executed on a parallel computing platform comprising of one or more graphical processing units (GPUs). For example, in one embodiment, a parallel computing platform is configured to execute multiple instances of the simulation in parallel. Any parallel computing platform generally known in the art may be used to facilitate parallel execution and programming models, including the NVIDIA™ Compute Unified Device Architecture (CUDA) may be used to optimize usage of the processing units in simulation computations.

Figure 3:
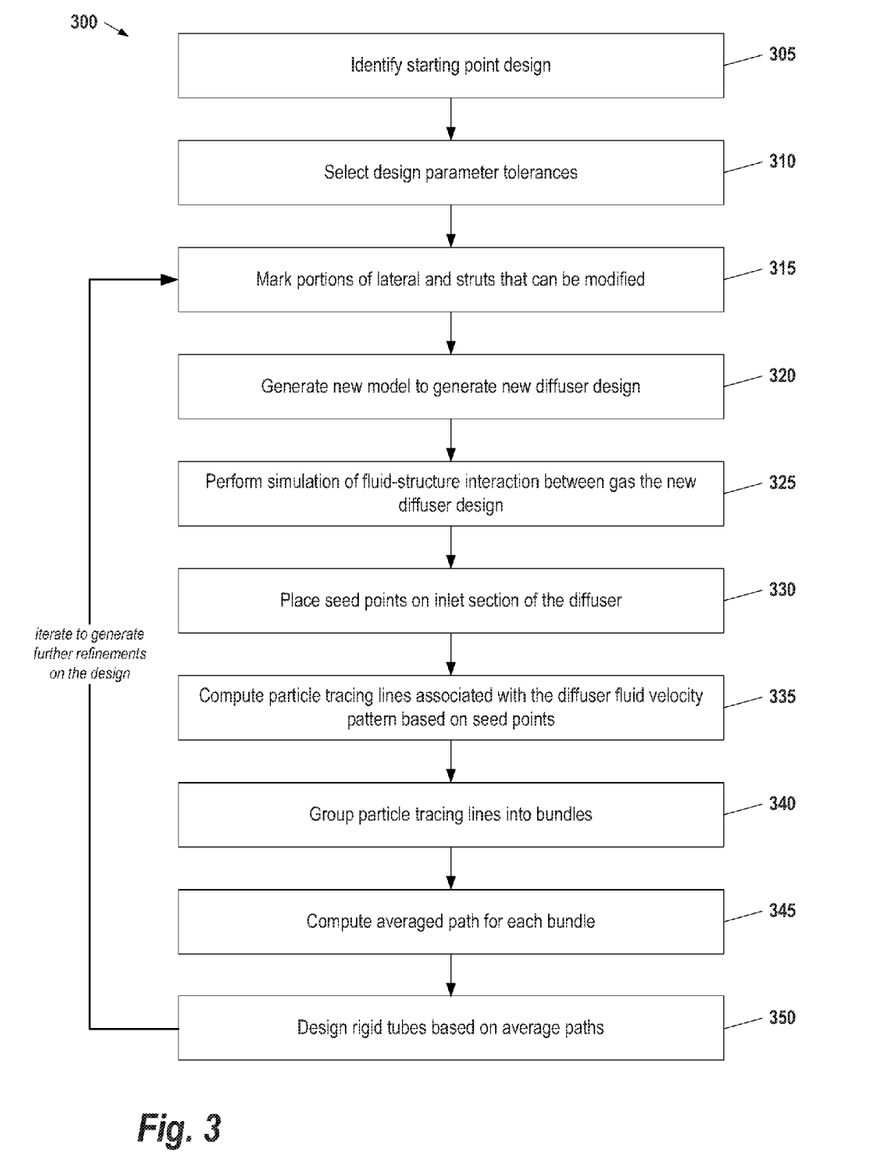
FIG. 3 provides an overview of a process for designing the geometry of a gas turbine exhaust diffuser on the basis of fluid dynamics information, according to some embodiments.

FIG. 3 provides an overview of a process 300 for designing the geometry of a gas turbine exhaust diffuser on the basis of fluid dynamics information, according to some embodiments. Starting at step 305, the starting point design that needs to be improved (e.g. the commonly used divergent shape) is identified. This design will be referred to as $S_0 = S_{inlet_0} \cup S_{outlet_0} \cup S_{lateral_0} \cup S_{struts_0}$ where 0 subscript refers to the initial configuration, $S_{inlet}$ indicates the opening through which the gas enters the diffuser, $S_{outlet}$ indicates the opening through which the gas exits from the diffuser, $S_{lateral}$ indicates the inner surface of the diffuser which connect $S_{inlet}$ to $S_{outlet}$, $S_{struts}$ defines the surface of the support struts in the diffuser, which is touched by the gas. $S_0$ is then associated with $M_0$, which is the collection of material properties of the diffuser's walls.

At step 310, the user provides constraint information specifying how much the new design should deviate from $S_0$. This information may be provided, for example, by inputting information into the computer implementing the process (e.g., Design Computer 215). In some embodiments, a graphical user interface (GUI) is provided which allows the user to interact with the starting point design $S_0$ and designate deviation values for certain components. For example, the user may select a particular strut through the GUI and input information indicating that the design of that strut should not deviate by more than 5% if the design is modified. Alternatively, in some instances, the user may be permitted to provide more coarse design specifications (e.g., the overall weight of the diffuser should not deviate more than 10% in alternative designs).

Once the deviation constraints are set, portions of the original design $S_0$ that can be modified are selected and marked accordingly at step 315. In the example of FIG. 3, it is assumed that only portions of $S_{lateral_0}$ and $S_{struts_0}$ may be modified (i.e., retaining the original configuration of the $S_{inlet}$ to $S_{outlet}$). The marking provided at step 315 will allow the simulation (discussed in further detail below) to decide which parameters should be modified when selecting a new design model. So, for example, a user may indicate that a particular strut can be modified. Then, during the model generation step, parameters such as cross-section can be adjusted from their $S_{struts_0}$ values. Various techniques may be used for selecting the portions of $S_{lateral_0}$ and $S_{struts_0}$ that can be modified. For example, in some embodiments, a GUI is provided which allows the user to interact with a graphical representation of the starting point design (identified in step 305). The user can then select and mark points on the lateral and strut portion, for example, by a user clicking on a portion of the initial design.

From the information provided at steps 310 and 315, a new model $S_1$ is then generated at step 320 by optimizing the design according to one or more objective functions). The model generation process applied at step 320 may entail changes to various aspects of the diffuser defined by $S_0$, including its physical characteristics and the materials used in its construction. For example, in some embodiments, the new model $S_1$ is generated by removing portions of $S_0$ (e.g., enclosed surfaces such as $S_{struts}$). In other embodiments, the model $S_1$ is generated by artificially modifying the material properties $M_0$ to more flexible $M_1$ (e.g., non-rigid elastic membrane), to indicate that the actual configuration of such surface can deviate from its original shape. In these embodiments, $S_{inlet}$ and $S_{outlet}$ may not be modelled with modified material properties, but rather with different positions on the longitudinal axis or shape, to better reflect meaningful design variations. It should be noted that the material configuration $M_1$ should not be interpreted as the actual material properties for the diffuser manufacturing, but as fictitious material properties to allow flexibility from the original design. Essentially, virtually constructing the fictitious diffuser $(S_1, M_1)$ is a way to represent the original design after having relaxed some constraints.

At step 325, a CAE simulation of the fluid-structure interaction between the gas and the diffuser $(S_1, M_1)$ is performed to determine a fluid velocity pattern associated with the design. This pattern is characterized by a longitudinal component and a swirl component corresponding to gas flow through the diffuser. In some embodiments, the user may prescribe boundary conditions proper of the aerodynamic problem considered by the CAE simulation. Alternatively, in some instances, a default set of boundary conditions may be applied if the diffuser $(S_1, M_1)$ is similar to a preexisting design previously processed by the CAE simulation.

Next, at steps 330 and 335, lines are generated which trace a particle flow along the fluid velocity pattern. First, at step 330, seed points are placed on the inlet section of the diffuser $(S_1, M_1)$. In some embodiments, these seed points are uniformly distributed across the inlet section. In other embodiments, information about the design of the diffuser $(S_1, M_1)$ may be used to select locations for the seed points. For example, seed points can be placed on the inlet section at locations that avoid points where the diffuser $(S_1, M_1)$ is intended to connect to other portions of the turbine. Then, at step 335 the fluid velocity pattern is analyzed and used to compute particle tracing lines based on the seed points, as described above with respect to the Particle Tracing Module 215D in FIG. 2.

After the particle tracing lines have been generated they are grouped into bundles at step 340, based on their respective proximity to the seed points. For example, in one embodiment, the seed points are distributed such that they divide the inlet section into 4 quarters. In this instance, one or more bundles may be generated for each quarter. Then, at step 345, a single path per originating region is generated based on their averaged or common traits. These averaged paths (4 in the example set out above) are then used as centerlines at step 350 to design rigid tubes, channeling the gas flow. This channeled flow is expected to greater reduce the areas of flow stagnation and low pressure inside the diffuser, increasing the overall turbine efficiency. Steps 315-350 can be further iterated, to generate $(S_2, M_2)$ and so on, for further refinements of the design.

Figure 4:
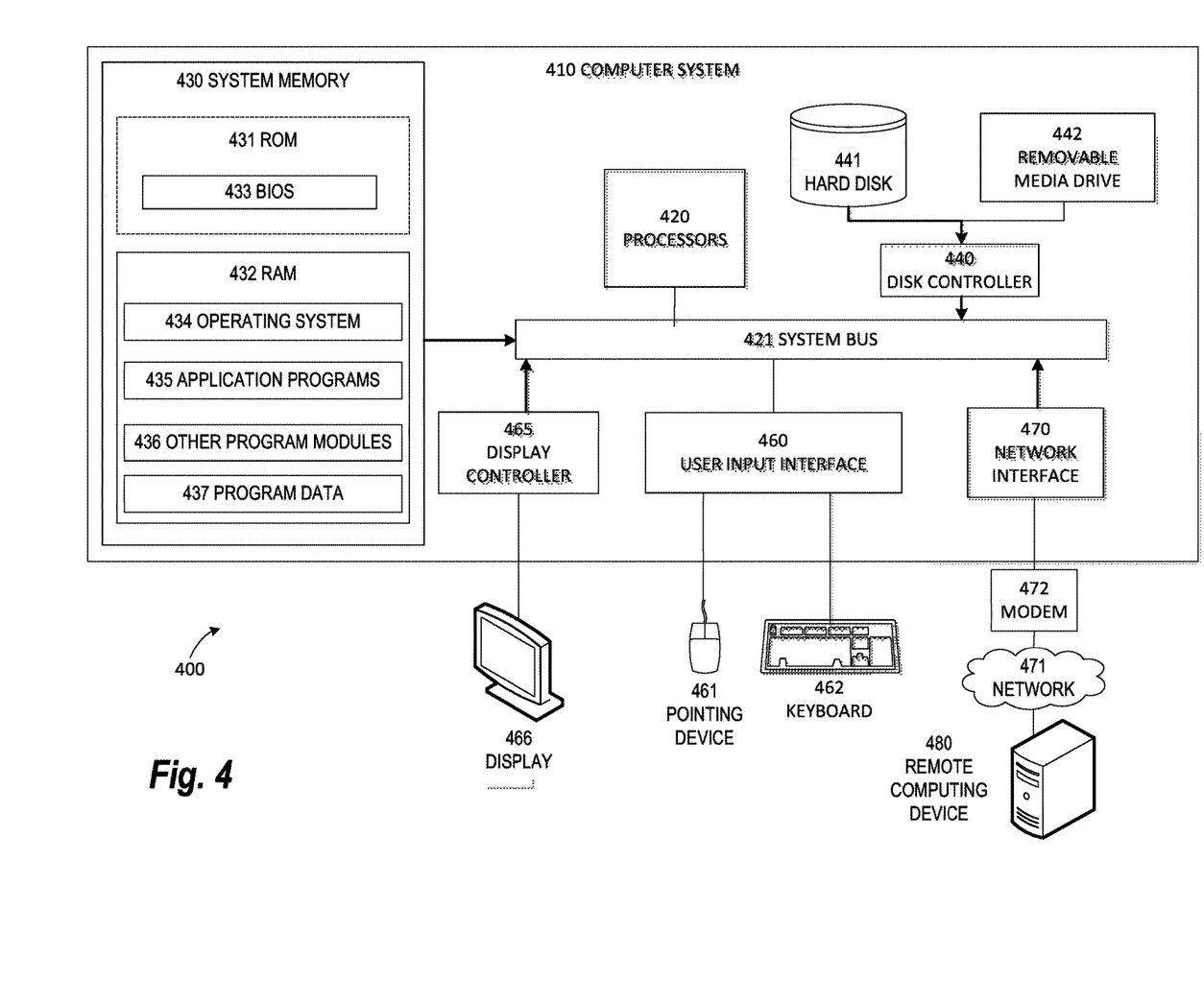
FIG. 4 illustrates an exemplary computing environment within which embodiments of the invention may be implemented.

FIG. 4 illustrates an exemplary computing environment 400 within which embodiments of the invention may be implemented. For example, this computing environment 400 may be used to implement the process 300 described in FIG. 3 as well one or more of the components illustrated in the system 200 of FIG. 2. The computing environment 400 may include computer system 410, which is one example of a computing system upon which embodiments of the invention may be implemented. Computers and computing environments, such as computer system 410 and computing environment 400, are known to those of skill in the art and thus are described briefly herein.

As shown in FIG. 4, the computer system 410 may include a communication mechanism such as a bus 421 or other communication mechanism for communicating information within the computer system 410. The computer system 410 further includes one or more processors 420 coupled with the bus 421 for processing the information. The processors 420 may include one or more central processing units (CPUs), graphical processing units (GPUs), or any other processor known in the art.

The computer system 410 also includes a system memory 430 coupled to the bus 421 for storing information and instructions to be executed by processors 420. The system memory 430 may include computer readable storage media in the form of volatile and/or nonvolatile memory, such as read only memory (ROM) 431 and/or random access memory (RAM) 432. The system memory RAM 432 may include other dynamic storage device(s) (e.g., dynamic RAM, static RAM, and synchronous DRAM). The system memory ROM 431 may include other static storage device (s) (e.g., programmable ROM, erasable PROM, and electrically erasable PROM). In addition, the system memory 430 may be used for storing temporary variables or other intermediate information during the execution of instructions by the processors 420. A basic input/output system (BIOS) 433 containing the basic routines that help to transfer information between elements within computer system 410, such as during start-up, may be stored in ROM 431. RAM 432 may contain data and/or program modules that are immediately accessible to and/or presently being operated on by the processors 420. System memory 430 may additionally include, for example, operating system 434, application programs 435, other program modules 436 and program data 437.

The computer system 410 also includes a disk controller 440 coupled to the bus 421 to control one or more storage devices for storing information and instructions, such as a hard disk 441 and a removable media drive 442 (e.g., floppy disk drive, compact disc drive, tape drive, and/or solid state drive). The storage devices may be added to the computer system 410 using an appropriate device interface (e.g., a small computer system interface (SCSI), integrated device electronics (IDE), Universal Serial Bus (USB), or FireWire).

The computer system 410 may also include a display controller 465 coupled to the bus 421 to control a display 466, such as a cathode ray tube (CRT) or liquid crystal display (LCD), for displaying information to a computer user. The computer system includes an input interface 460 and one or more input devices, such as a keyboard 462 and a pointing device 461, for interacting with a computer user and providing information to the processor 420. The pointing device 461, for example, may be a mouse, a trackball, or a pointing stick for communicating direction information and command selections to the processor 420 and for controlling cursor movement on the display 466. The display 466 may provide a touch screen interface which allows input to supplement or replace the communication of direction information and command selections by the pointing device 461.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium, such as a hard disk 441 or a removable media drive 442. The hard disk 441 may contain one or more datastores and data files used by embodiments of the present invention. Datastore contents and data files may be encrypted to improve security. The processors 420 may also be employed in a multi-processing arrangement to execute the one or more sequences of instructions contained in system memory 430. In alternative embodiments, hardwired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processor 420 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 441 or removable media drive 442. Non-limiting examples of volatile media include dynamic memory, such as system memory 430. Non-limiting examples of transmission media include coaxial cables, copper wire, and fiber optics, including the wires that make up the bus 421. Transmission media may also take the form of acoustic or light waves, such as those generated during radio wave and infrared data communications.

The computing environment 400 may further include the computer system 410 operating in a networked environment using logical connections to one or more remote computers, such as remote computer 480. Remote computer 480 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computer 480). The network 471 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 45 U.S.C. 112, sixth paragraph, unless the element is expressly recited using the phrase "means for."

The invention claimed is:

1. A computer-implemented method for designing a gas turbine exhaust diffuser, the method comprising:
   identifying, by a computer, an initial diffuser design;
   performing, by the computer, a design refinement process comprising:
      generating a new diffuser design by modifying the initial diffuser design according to one or more objective functions and one or more design constraints;
      determining a fluid velocity pattern associated with the new diffuser design;
      computing a plurality of particle tracing lines through an internal portion of the new diffuser design using the fluid velocity pattern;
      grouping the plurality of particle tracing lines into a plurality of particle line bundles extending longitudinally within the new diffuser design;
      compute a plurality of average paths, each average path corresponding to one of the particle line bundles;
      for each respective average path, generating a rigid tube of a plurality of rigid tubes, the rigid tube configured to channel gases through the internal portion of the new diffuser design wherein the channeled flow of gases reduces areas of stagnation and low pressure inside the diffuser increasing overall gas turbine efficiency; and
      adding each rigid tube of the plurality of rigid tubes to the new diffuser design.

2. The method of claim 1, further comprising:
   randomly generating the one or more design constraints.

3. The method of claim 1, further comprising:
   receiving a user selection of the one or more design constraints via a graphical user interface displayed by the computer.

4. The method of claim 1, wherein generating the new diffuser design further comprises:
   selecting one or more enclosed surfaces of the initial diffuser design; and
   omitting the one or more enclosed surfaces from the new diffuser design.

5. The method of claim 4, wherein at least one of the enclosed surfaces comprises a stmt component of the initial diffuser design.

6. The method of claim 1, wherein generating the new diffuser design further comprises:
   determining first material properties associated with a lateral portion of the initial diffuser design;
   selecting second material properties which provide more longitudinal flexibility than the first material properties; and
   providing the second material properties for a corresponding lateral portion of the new diffuser design.

7. The method of claim 6, wherein the second material properties correspond to a non-rigid elastic membrane.

8. The method of claim 1, wherein generating the new diffuser design further comprises:
   identifying an initial inlet location on the longitudinal axis of the initial diffuser design;
   selecting a new inlet location on the longitudinal axis of the initial diffuser design;
   constraining generation of the new diffuser design such that an inlet associated with the new diffuser design is located at the new inlet location.

9. The method of claim 1, wherein generating the new diffuser design further comprises:
   identifying an initial inlet shape associated with the initial diffuser design;
   selecting a new inlet shape that is distinct from the initial inlet shape;
   constraining generation of the new diffuser design such that an inlet associated with the new diffuser design is shaped according to the new inlet shape.

10. The method of claim 1, wherein generating the new diffuser design further comprises:
    identifying an initial outlet location on the longitudinal axis of the initial diffuser design;
    selecting a new outlet location on the longitudinal axis of the initial diffuser design;
    constraining generation of the new diffuser design such that an outlet associated with the new diffuser design is located at the new outlet location.

11. The method of claim 1, wherein generating the new diffuser design further comprises:
    identifying an initial outlet shape associated with the initial diffuser design;
    selecting a new outlet shape that is distinct from the initial outlet shape;
    constraining generation of the new diffuser design such that an outlet associated with the new diffuser design is shaped according to the new outlet shape.

12. The method of claim 1, further comprising:
    iteratively repeating the design refinement process one or more additional times to generate at least one additional new diffuser design, wherein each additional new design is generated using a unique set of design constraints.

13. An article of manufacture for designing a gas turbine exhaust diffuser, the article of manufacture comprising a non-transitory, non-volatile tangible computer-readable medium holding computer-executable instructions for performing a method comprising:
    receiving an initial diffuser design;
    performing a design refinement process comprising:
       designating portions of the initial diffuser design for modification;
       generating a new diffuser design by modifying the portions of the initial diffuser design designated for modification;
       determining a fluid velocity pattern associated with the new diffuser design;
       computing a plurality of particle tracing lines through an internal portion of the new diffuser design using the fluid velocity pattern;
       grouping the plurality of particle tracing lines into a plurality of particle line bundles extending longitudinally within the new diffuser design;
       computing a plurality of average paths, each average path corresponding to one of the particle line bundles;
       for each respective average path, generating a rigid tube of a plurality of rigid tube, the rigid tube configured to channel gases through the internal portion of the new diffuser design wherein the channeled flow of gases reduces areas of stagnation and low pressure inside the diffuser increasing overall gas turbine efficiency; and
       adding each rigid tube of the plurality of rigid tubes to the new diffuser design.

14. The article of manufacture of claim 13, wherein the method further comprises:
- displaying the initial diffuser design in a graphical user interface; and
- receiving the designation of portions of the initial diffuser design for modification via the graphical user interface.

15. The article of manufacture of claim 14, wherein a user selects a component of the initial diffuser design via the graphical user interface in order to designate it for modification.

16. The article of manufacture of claim 13, wherein generating the new diffuser design further comprises:
- selecting one or more enclosed surfaces of the initial diffuser design; and
- omitting the one or more enclosed surfaces from the new diffuser design.

17. The article of manufacture of claim 13, wherein generating the new diffuser design further comprises:
- determining first material properties associated with a lateral portion of the initial diffuser design;
- selecting second material properties which provide more longitudinal flexibility than the first material properties; and
- providing the second material properties for a corresponding lateral portion of the new diffuser design.

18. The article of manufacture of claim 13, further comprising:
- iteratively repeating the design refinement process one or more additional times to generate at least one additional new diffuser design, wherein each additional new design is generated using a unique set of design constraints.

19. A computer-implemented method for designing a gas turbine exhaust diffuser, the method comprising:
- identifying, by a first computer, an initial diffuser design;
- performing, by a parallel computing parallel computing architecture, a design refinement process comprising:
  - executing multiple instances of a computational fluid model generation module in parallel to generate a plurality of alternative diffuser designs;
  - executing multiple instances of a Computational Fluid Dynamics (CFD) simulation module in parallel to generate a fluid velocity pattern for each of the plurality of alternative diffuser designs;
  - generating one or more rigid tubes configured to channel gas flow for each of the plurality of alternative diffuser designs according to the corresponding fluid velocity pattern for each respective alternative diffuser design wherein the channeled flow of gases reduces areas of stagnation and low pressure inside the diffuser increasing overall gas turbine efficiency.

20. The method of claim 19, further comprising:
- executing multiple instances of a particle tracing module in parallel to generate trace particle flow through each of the alternative diffuser designs, according to its fluid respective velocity pattern; and
- for each respective alternative diffuser design, utilizing the particle flow for the respective alternative diffuser design to identify locations for its one or more rigid tubes.

* * * * *